(12) United States Patent
Wang

(10) Patent No.: US 9,100,786 B2
(45) Date of Patent: Aug. 4, 2015

(54) POSITIONING WITH WIRELESS LOCAL AREA NETWORKS AND WLAN-AIDED GLOBAL POSITIONING SYSTEMS

(71) Applicant: QUALCOMM Incorporated, San Diego, CA (US)

(72) Inventor: Yi-Hsiu Wang, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/070,439

(22) Filed: Nov. 1, 2013

(65) Prior Publication Data
US 2014/0057654 A1 Feb. 27, 2014

Related U.S. Application Data

(60) Division of application No. 13/309,537, filed on Dec. 1, 2011, and a division of application No. 12/904,085, filed on Oct. 13, 2010, now Pat. No. 8,095,155, and a division of application No. 11/461,335, filed on Jul. 31, 2006, now Pat. No. 7,899,472, and a continuation of application No. 10/367,524, filed on Feb. 14, 2003, now Pat. No. 7,130,646.

(51) Int. Cl.
*H04W 24/00* (2009.01)
*H04W 4/02* (2009.01)
*G01S 5/14* (2006.01)
(Continued)

(52) U.S. Cl.
CPC .. *H04W 4/02* (2013.01); *G01S 5/14* (2013.01); *G01S 19/05* (2013.01); *G01S 19/48* (2013.01); *H04W 64/00* (2013.01); *G01S 5/12* (2013.01); *G01S 19/28* (2013.01)

(58) Field of Classification Search
CPC .. H04W 64/00; H04W 4/02; H04L 29/08657; G01S 5/02
USPC ................... 455/456.5, 456.6, 456.1; 342/457
See application file for complete search history.

(56) References Cited

U.S. PATENT DOCUMENTS 6,249,252 B1 6/2001 Dupray
6,414,635 B1 * 7/2002 Stewart et al. ................ 342/457
(Continued)

FOREIGN PATENT DOCUMENTS

WO 01/95056 A2 12/2001

OTHER PUBLICATIONS

International Preliminary Report on Patentabillty—PCT/US2004/003468, The International Bureau of WIPO, Aug. 19, 2005.
(Continued)

*Primary Examiner* — Danh Le
(74) *Attorney, Agent, or Firm* — Bever, Hoffman & Harms, LLP

(57) ABSTRACT

Accurate position capability can be quickly provided using a Wireless Local Area Network (WLAN). When associated with a WLAN, a wireless device can quickly determine its relative and/or coordinate position based on information provided by an access point in the WLAN. Before a wireless device disassociates with the access point, the WLAN can periodically provide time, location, and decoded GPS data to the wireless device. In this manner, the wireless device can significantly reduce the time to acquire the necessary GPS satellite data (i.e. on the order of seconds instead of minutes) to determine its coordinate position.

22 Claims, 6 Drawing Sheets

(51) Int. Cl.
*G01S 19/05* (2010.01)
*G01S 19/48* (2010.01)
*H04W 64/00* (2009.01)
*G01S 5/12* (2006.01)
*G01S 19/28* (2010.01)

(56) References Cited

U.S. PATENT DOCUMENTS

| | | |
|---|---|---|
| 6,415,154 B1 | 7/2002 | Wang et al. |
| 6,473,038 B2 | 10/2002 | Patwari et al. |
| 6,515,623 B2 | 2/2003 | Johnson |
| 6,888,811 B2 | 5/2005 | Eaton et al. |
| 6,995,708 B2 | 2/2006 | Schmidt |
| 7,130,646 B2 | 10/2006 | Wang |
| 7,254,400 B1 | 8/2007 | Sakakura |
| 7,502,614 B2 * | 3/2009 | Uchida et al. ............. 455/436 |
| 7,764,231 B1 * | 7/2010 | Karr et al. ................ 342/457 |
| 7,899,472 B1 | 3/2011 | Wang |
| 8,095,155 B2 | 1/2012 | Wang |
| 8,509,731 B2 | 8/2013 | Kholaif et al. |
| 2003/0043073 A1 * | 3/2003 | Gray et al. ................. 342/465 |
| 2003/0134648 A1 | 7/2003 | Reed et al. |
| 2003/0216143 A1 * | 11/2003 | Roese et al. .............. 455/456.1 |
| 2003/0220765 A1 | 11/2003 | Overy et al. |
| 2004/0085909 A1 | 5/2004 | Soliman |
| 2004/0198375 A1 * | 10/2004 | Schwengler et al. ...... 455/456.1 |
| 2005/0075119 A1 | 4/2005 | Sheha et al. |
| 2005/0255857 A1 | 11/2005 | Kim et al. |
| 2007/0149240 A1 | 6/2007 | Brok |
| 2010/0130244 A1 | 5/2010 | Hong et al. |
| 2010/0317391 A1 | 12/2010 | Mody et al. |
| 2011/0045840 A1 | 2/2011 | Alizadeh-Shabdiz et al. |
| 2012/0076122 A1 | 3/2012 | Wang |
| 2012/0309410 A1 | 12/2012 | Marti et al. |
| 2014/0057653 A1 | 2/2014 | Wang |

OTHER PUBLICATIONS

International Search Report and Written Opinion—PCT/US2004/003468, ISA/US, Dec. 29, 2004.

* cited by examiner

POSITIONING WITH WIRELESS LOCAL AREA NETWORKS AND WLAN-AIDED GLOBAL POSITIONING SYSTEMS

RELATED APPLICATIONS

This application is a divisional of U.S. patent application Ser. No. 13/309,537 entitled "Positioning With Wireless Local Area Networks And WLAN-Aided Global Positioning Systems" filed Dec. 1, 2011 which is a divisional of U.S. patent application Ser. No. 12/904,085 entitled "Positioning With Wireless Local Area Networks And WLAN-Aided Global Positioning Systems" filed Oct. 13, 2010, now U.S. Pat. No. 8,095,155 which is a divisional of U.S. patent application Ser. No. 11/461,335, entitled "Positioning With Wireless Local Area Networks And WLAN-Aided Global Positioning Systems" filed Jul. 31, 2006, now U.S. Pat. No. 7,899,472 which is a continuation of U.S. patent application Ser. No. 10/367,524, entitled "Positioning With Wireless Local Area Networks And WLAN-Aided Global Positioning Systems" filed Feb. 14, 2003, now U.S. Pat. No. 7,130,646.

BACKGROUND OF THE INVENTION

1. Field of the Invention

The present invention relates to quickly and accurately determining the position of an end user using a wireless local area network (WLAN). Alternatively, assuming the end user has recently left the WLAN, the present invention relates to using the WLAN information to more quickly determine the position of the end user using a global positioning system (GPS).

2. Related Art

Location information of a mobile user is increasingly being used in a wide range of situations. For example, such location information can help a person navigate in an unfamiliar area, thereby allowing that person to quickly find a restaurant, shopping center, or some other destination. In addition to being useful, location information can also be critical in emergency situations. For example, location information can be used to reach a person that has dialed 911 from a cellular phone. To ensure that emergency personnel can find that person in need, the FCC mandates that cellular providers report the 911 caller location, known as enhanced 911.

To comply with this mandate, cellular phones can access a system called Global Positioning System (GPS) to provide location information. GPS currently includes a nominal operational constellation of 24 satellites in orbit. The constellation configuration includes six equally spaced orbital planes provided 60 degrees apart and inclined at approximately 55 degrees from the equatorial plane. Of importance, this constellation configuration allows a receiver to establish contact with multiple satellites, e.g. between 4 and 8 satellites, from any point on earth.

Although still controlled by the U.S. Department of Defense, GPS is available to the general public at no charge and provides high location accuracy (e.g. within 100 meters). However, GPS poses two major problems with respect to wireless devices (e.g. cellular phones). First, GPS receivers do not work reliably indoors due to either attenuation (e.g. the signal is too weak to be received) or reflection (e.g. the GPS receiver inadvertently picks up a reflected signal (a phenomenon known as multipath), and therefore computes the wrong position).

Second, even under ideal conditions, a GPS receiver can take a significant period of time to compute its position. Specifically, conventional GPS receivers need to decode GPS satellite data before the first position can be computed. Because the current data rate for a GPS signal is only 50 bit per second, the GPS receiver may require up to 12.5 minutes to collect the GPS satellite data necessary in a "cold start" to determine the first position. A cold start means that both the GPS almanac, i.e. the approximate orbital data parameters for the satellites, and a rough position of the device are not known. Moreover, even in a "warm start" in which the GPS almanac and rough location are known, but not the GPS ephemeris, i.e. detailed data parameters that describe short sections of the satellite orbits, the GPS receiver may still require approximately 40 seconds to determine the position of the device. This time period may cause users various degrees of adverse results ranging from mere inconvenience to life-threatening situations.

Other positioning techniques have been proposed, but have not been acceptable due to their disadvantages. For example, in a positioning technique called triangularization, a time difference of arrival (TDOA) is calculated to locate a wireless caller. However, triangularization requires at least three reference points (base stations) to get a reasonably accurate position, and typically a cellular phone is covered by only one base station. In another positioning technique provided by Snaptrack, a subsidiary of Qualcomm, a GPS receiver can track satellites indoors using one or more cell phone networks. However, this technique works only within cellular phone coverage and requires modifications of current cell phone infrastructure.

Therefore, a need arises for a method of quickly determining an accurate position of a device using an existing infrastructure.

SUMMARY OF THE INVENTION

A conventional GPS receiver cannot work under certain conditions, such as when the GPS receiver is inside a building, inside a tunnel, or under a bridge. Under these conditions, the signal from a GPS satellite is blocked, thereby preventing the GPS receiver from determining its position. Unfortunately, even when the signal from the GPS satellite is received, the decoding of that signal can take a significant amount of time. This decoding time can be merely annoying, e.g. if a user is trying to navigate from one location to the user's destination, or even life threatening, e.g. if the user is in an emergency situation and needs assistance immediately.

In accordance with one aspect of the invention, a wireless local area network (WLAN) can quickly provide accurate position information to a user via a wireless device (also called a client herein). Specifically, when associated with a WLAN, a client can quickly determine its position based on information provided by an access point in the WLAN. Even when a client disassociates with the access point, the WLAN can provide time, location, and decoded GPS data to the client before its disassociation. In this manner, the client can significantly reduce the time to acquire the necessary GPS satellite data (i.e. on the order of seconds instead of minutes) to determine its coordinate position.

The method includes identifying a first access point having a first known location and a predetermined radio propagation range of r. The position of a wireless device, which is capable of associating with the access point, is the first known location with an uncertainty of r. In this manner, even the relative position of the wireless device is within an acceptable range of accuracy for emergency service.

To further refine this relative position, the method can further include determining a radio signal strength indicator (RSSI) of the access point. The RSSI can be correlated to a distance, which could be stored in a lookup table (LUT) in the wireless device. The stored distance represents a more accurate relative distance from the access point to the wireless device.

To obtain a coordinate position (x0, y0, z0) of the wireless device, the wireless device can receive information from additional access points. Specifically, the wireless device can identify second and third access points, each having known locations. The wireless device can then determine second and third RSSIs of the second and the third access points, respectively. The second and third RSSIs can be correlated to second and third stored distances. The second stored distance represents a second relative distance from the second access point to the wireless device, whereas the third stored distance represents a third relative distance from the third access point to the wireless device. At this point, the wireless device can compute its coordinate position using the first, second, and third known positions and the first, second, and third relative distances.

For example, if the first known position is (x1, y1, z1) and the first relative position is r1, the second known position is (x2, y2, z2) and the second relative position is r2, and the third known position is (x3, y3, z3) and the third relative position is r3, then computing the coordinate position includes using a set of equations:

$$x0=(w1*x1)+(w2*x2)+(w3*x3),$$

$$y0=(w1*y1)+(w2*y2)+(w3*y3), \text{ and}$$

$$z0=(w1*z1)+(w2*z2)+(w3*z3),$$

wherein $$w1=(1/r1)/(1/r1+1/r2+1/r3),$$

$$w2=(1/r2)/(1/r1+1/r2+1/r3), \text{ and}$$

$$w3=(1/r3)/(1/r1+1/r2+1/r3).$$

In another embodiment of the invention, the use of multiple antennas within an access point can also facilitate quickly and accurately providing a coordinate position of the wireless device. In this embodiment, the wireless device can determine an RSSI associated with each of the multiple antennas. The signal path of the antenna associated with a highest RSSI can be identified. Once again, the highest RSSI can be correlated to a stored distance, wherein the stored distance represents a relative distance from the access point to the wireless device. At this point, the wireless device can use the angles associated with the signal path and the relative distance to compute a coordinate position of the wireless device.

The angles associated with the signal path can include an angle θ, which is measured taken from an x-axis to the signal path, and an angle Φ, which is measured from the signal path to a path connecting the wireless device and the access point. Assuming the coordinate position of the wireless device is (x4, y4, z4) and the relative position is r4, then the wireless device can compute its coordinate position using a set of equations:

$$x4=x5+(r4*\cos(\Phi)*\cos(\theta)),$$

$$y4=y5+(r4*\cos(\Phi)*\sin(\theta)), \text{ and}$$

$$z4=z5+(r4*\sin(\Phi)).$$

In accordance with one embodiment of the invention, a method of determining a new common position of a first device and a second device (both having wireless networking capability) is provided. In this embodiment, the first and second devices exchange information in an ad hoc communication mode. The shared information includes the last positions of the first and second devices as well as the update times associated with those last positions. Of importance, access points previously associated with the first and second devices can provide the last positions and update times.

For example, assume the first client has a last position (x11, y11, z11), which was updated t1 seconds ago, and the second client has a last position (x12, y12, z12), which was updated t2 seconds ago. In this case, the common position (x, y, z) can be computed using a set of equations:

$$x=w1*x11+w2*x12$$

$$y=w1*y11+w2*y12$$

$$z=w1*z11+w2*z12$$

wherein weighting factors w1 and w2 are defined as:

$$w1=(1/t1)/(1/t1+1/t2)$$

$$w2=(1/t2)/(1/t1+1/t2).$$

In accordance with another aspect of the invention, information from a WLAN can facilitate determining a coordinate position of the wireless device using a global positioning system (GPS). Of importance, the information from the WLAN can include decoded GPS data, a current time, and a recent position. Note that because the wireless device does not need to decode a GPS signal itself, significant time (i.e. up to 12.5 minutes) is saved. Moreover, using this information, a first GPS satellite can be quickly identified for searching. This first GPS satellite advantageously has the highest elevation angle from the total operational set of GPS satellites (which minimizes the risk of signal blocking and significantly simplifies subsequent computations associated with other GPS satellites).

In one embodiment, to accelerate the searching process, the method can include partitioning multiple correlators into correlator pairs (i.e. groups of two) or correlator tracking sets (i.e. groups of three). These correlators ensure that the time and frequency offsets associated with the first GPS satellite are accurately determined. Once these offsets are determined, the time and frequency offsets for additional GPS satellites can be quickly derived. Position information associated with four GPS satellites is needed to provide a coordinate position for the wireless device.

Thus, as described above, various methods using a WLAN can be provided for quickly determining an accurate position of a device having wireless networking capability. In general, the methods include identifying a fixed position of one or more access points accessible by the device and computing the position of the device using short radio wave propagation between the access point(s) and the device.

Advantageously, this computed position can be used to provide emergency service for cell phones. Additionally, the WLAN position technique can advantageously augment the navigation tools of any type of wireless device, e.g. PDAs, cell phones, and notebooks. For example, the wireless device can provide local maps and points of interest for later GPS navigation with WLAN aided information. These navigation tools could be used from any location, e.g. home, work, airports, restaurants, hotels, etc.

The WLAN position technique can also be used in conjunction with location based applications. Specifically, a client can download a location based application and its related database from the WLAN and then move to a new location with or without WLAN connections. For example, a client could connect to an access point in a coffee shop (or some other LAN "hotspot") in Tokyo. At this point, an application server could quickly determine the client's location through the access point and then feed local maps along with other local points of interest (POI) to the client through the access point. Using this information, the client could then use the WLAN position technique or the WLAN aided GPS technique to navigate to a new location.

A WLAN system for facilitating providing a GPS position of a client is also provided. The system can include analog means for associating with the client, an analog to digital conversion means, and digital means for providing WLAN baseband operation as well as GPS baseband operation. Of importance, the analog means can include a frequency synthesizer that receives one of a first signal associated with WLAN baseband operation and a second signal associated with GPS baseband operation. The WLAN system can further include means for providing decoded GPS data to the client preceding disassociation of the client from the WLAN.

Advantageously, the position techniques using WLAN and the WLAN aided GPS are complementary. Specifically, if the client is operating within a WLAN, then the client can quickly compute its relative and/or a coordinate position based on information from an access point. At this point, no GPS tracking is necessary because an acceptably accurate location of the client can be provided solely via the WLAN. When the client disassociates with the WLAN, the WLAN can provide the client with decoded GPS data, time, most recent position information, thereby ensuring that the client can significantly reduce its searching time for the necessary GPS satellites in order to compute its coordinate position.

DETAILED DESCRIPTION OF THE FIGURES

In accordance with one aspect of the invention, accurate position capability can be quickly provided using a Wireless Local Area Network (WLAN). As used herein, the term WLAN can include communication governed by the IEEE 802.11 standards (i.e. the 1999 standard as well as the proposed 2003 standard), Bluetooth (an open standard that enables short-range wireless links between various mobile units and connectivity to the Internet), HiperLAN (a set of wireless standards, comparable to the IEEE 802.11 standard, used primarily in Europe), and other technologies having relatively short radio propagation range. In accordance with another aspect of the invention, position capability can be provided using a WLAN in combination with GPS. These positioning techniques and their associated advantages will now be described in detail.

Positioning with Wireless Local Area Networks: Infrastructure Mode

One common mode of operation in wireless communication is the infrastructure mode. In an infrastructure mode, an access point can communicate with a plurality of clients associated with the access point. Clients in this WLAN communicate with each other through the access point. Thus, the access point functions as a communication hub between its associated clients.

An access point can also serve as a gateway for its clients to communicate with clients not associated with the access point. For example, a first access point can communicate with a second access point, which in turn can be associated with a plurality of its own clients. Because a client can be a mobile device whereas each access point has a fixed location and a predetermined range of service, a client may associate with the first access point for a first time period and then associate with the second access point for a second time period.

In accordance with one feature of the invention, the fixed location and range of the access point can be used to provide an accurate position of any of its clients. In one embodiment, the position of the access point can be determined (e.g. using electronic mapping or GPS) and stored in its database during setup. Of importance, when a client associates with the access point, the client's position is thus known to be within the radio propagation range of the access point.

Figure 1:
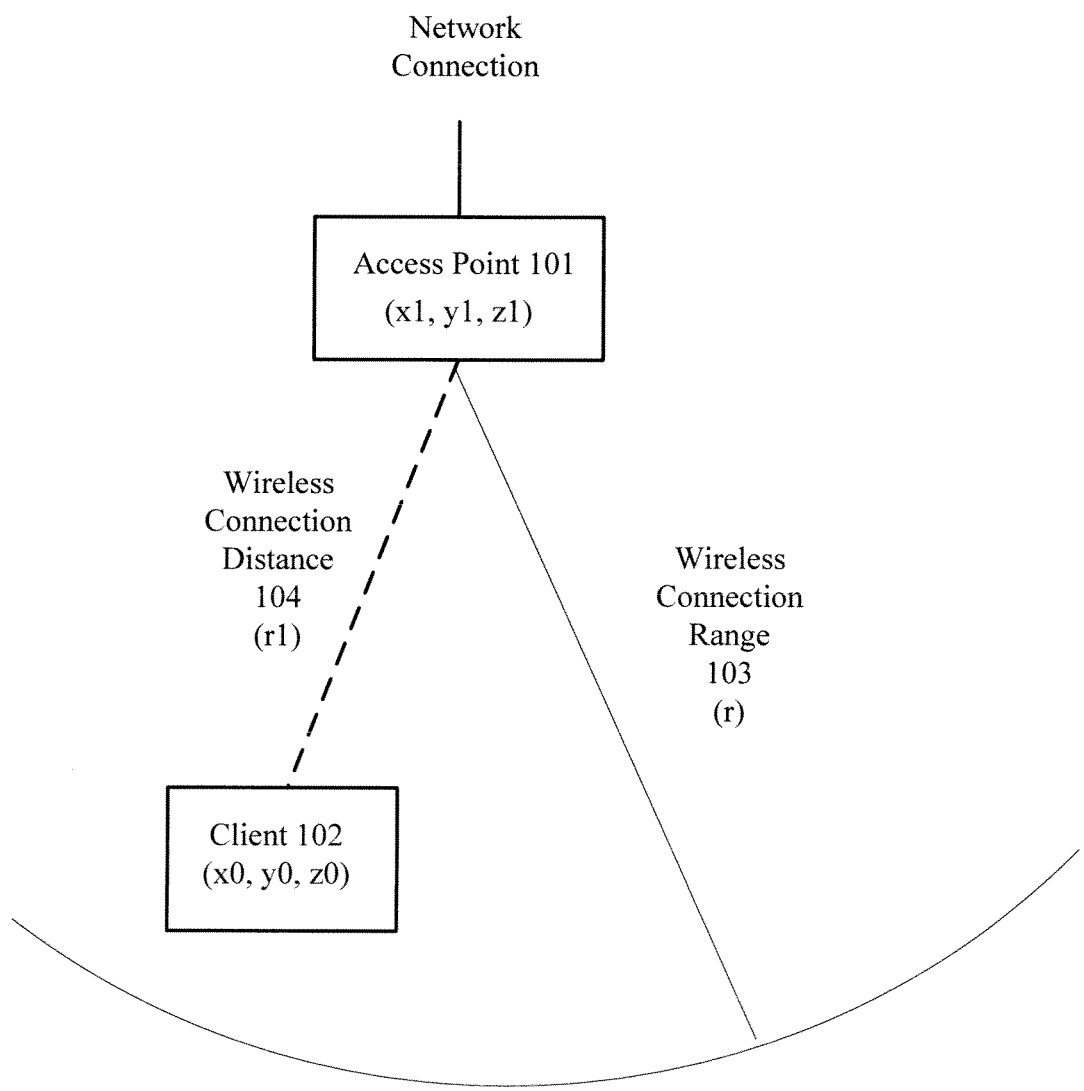
FIG. 1 illustrates how a relative position of a client in a wireless network, i.e. a WLAN, can be determined using the known position of an access point.

For example, FIG. 1 illustrates that if the position of an access point 101 is (x1, y1, z1) (indicating a location in three dimensional space) and the wireless connection range 103 is r, then the position of a client 102 associated with access point 101 is (x1, y1, z1) with an uncertainty of r. Logically, the longer the wireless connection range 103, the larger the uncertainty will be. Advantageously, because wireless connection range 103 is typically less than 100 meters, this accuracy can satisfy most user applications.

A client can further refine its position using a radio signal strength indicator (RSSI), which refers to the wideband power provided by the access point within channel bandwidth. Generally, a client receives a stronger signal from the access point when it is closer to that access point. Thus, an RSSI can be correlated to a particular distance from the access point.

For example, client 102 could determine its relative position with respect to access point 101 by using the RSSI from access point 101. In this manner, although the coordinate position of client 102, i.e. (x0, y0, z0), would still be unknown, client 102 could determine its wireless connection distance 104, i.e. relative position r1, based on the RSSI of access point 101. In one embodiment, this RSSI correlation can be stored in a lookup table (LUT), which can then be accessed by a client to refine its relative position.

Figure 2:
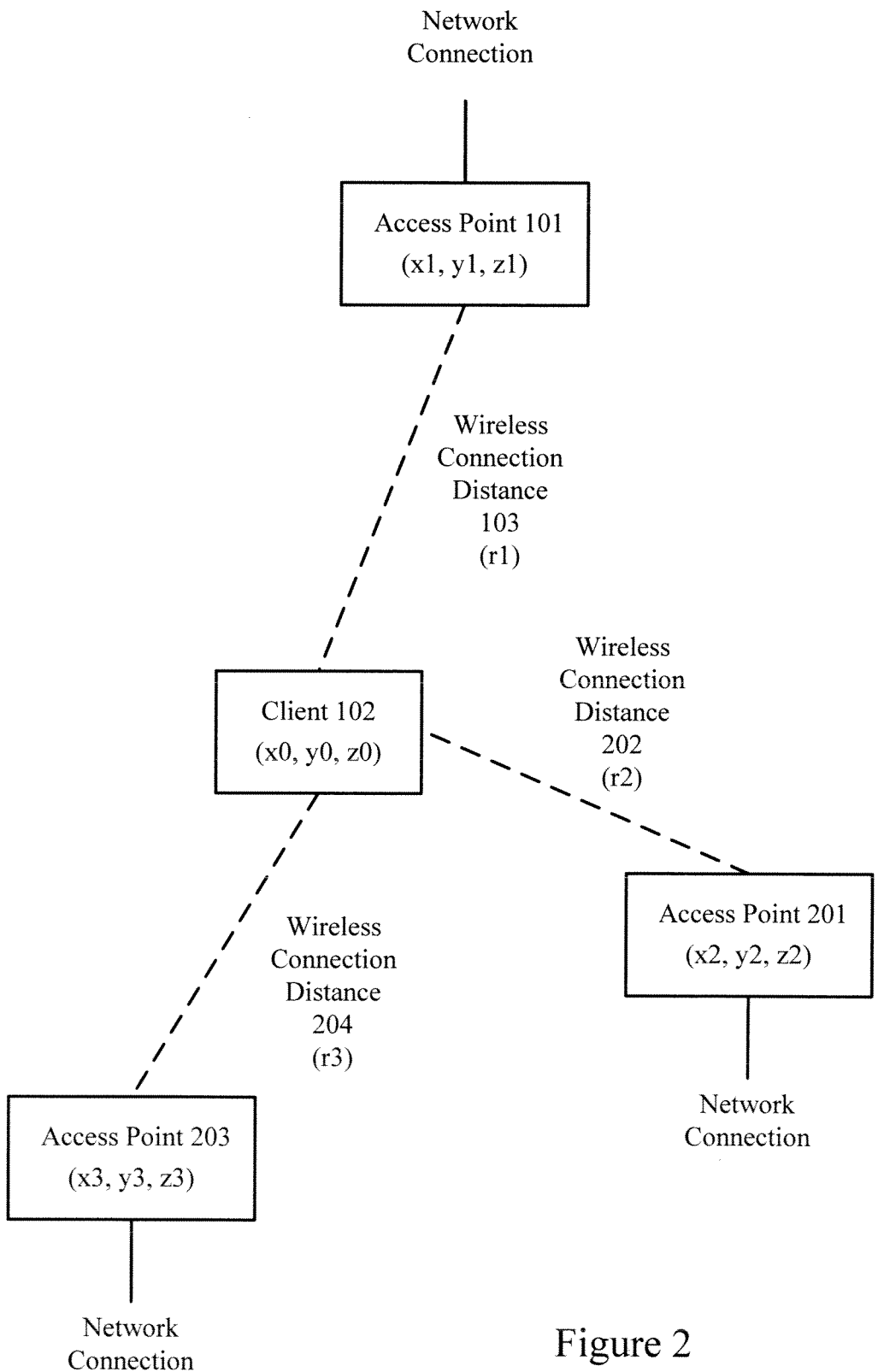
FIG. 2 illustrates how an accurate position of a client in a WLAN can be computed using the known positions of and wireless connection distances from multiple access points.

Of importance, if a client can associate with multiple access points, then the client can also advantageously use the RSSI corresponding to each access point to yet further refine its position. For example, FIG. 2 illustrates client 102 being within association range with access points 101, 201, and 203. In accordance with one aspect of the invention, client 102 can communicate with each access point, identify the fixed location of each access point, assess the RSSI of each access point, and determine a wireless connection distance (i.e. a relative position) to each access point. For example, in FIG. 2, client 102 can identify that access point 101 has a fixed position of (x1, y1, z1) and determine its wireless connection distance 103 (i.e. a relative position r1) to access point 101. Similarly, client 102 can identify that access point 201 has a fixed position of (x2, y2, z2) and determine its wireless connection distance 202 (i.e. a relative position r2) to access point 101. Finally, client 102 can identify that access point 203 has a fixed position of (x3, y3, z3) and determine its wireless connection distance 204 (i.e. a relative position r3) to access point 101.

Of importance, the location of client 102 (x0, y0, z0) can be accurately computed based on the locations of and wireless connection distances from access points 101, 201, and 203 with the following formulae:

$$x0=(w1*x1)+(w2*x2)+(w3*x3)$$

$$y0=(w1*y1)+(w2*y2)+(w3*y3)$$

$$z0=(w1*z1)+(w2*z2)+(w3*z3)$$

where weighting factors w1, w2, and w3 can be computed from the following formulae:

$$w1=(1/r1)/(1/r1+1/r2+1/r3)$$

$$w2=(1/r2)/(1/r1+1/r2+1/r3)$$

$$w3=(1/r3)/(1/r1+1/r2+1/r3)$$

In accordance with another aspect of the invention, if multiple antennas are used in an access point, the client can also use the angles of the signal path providing the strongest signal to compute its coordinate position. Specifically, an access point may switch back and forth between multiple antennas to determine which antenna provides the best signal strength for a particular client. After the access point identifies the best, i.e. the strongest, signal path to the client, the access point can transmit the angles associated with that best signal path to the client, which in turn can use those angles to compute its coordinate position. Note that if the necessary hardware resources are available, a client can also identify the best signal path. Further note that in one embodiment, the access point can compute the coordinate position of the station and then transmit that position to the station.

Figure 3A:
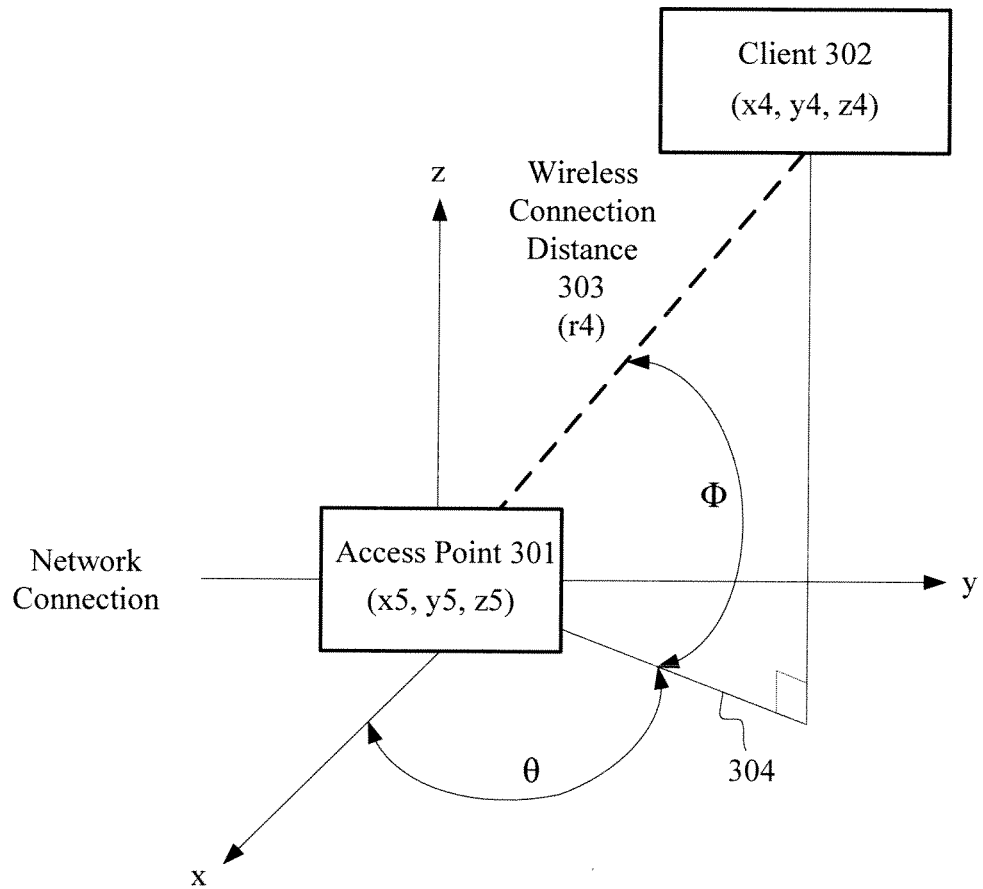
FIG. 3A illustrates that when multiple antennas are used by an access point, the client can use the angle of the signal path providing the strongest signal to further refine its position.

FIG. 3A illustrates a client 302 associated with an access point 301, which includes multiple antennas. After measuring the RSSIs from each of these antennas, access point 301 identifies the antenna having the best signal path, i.e. best signal path 304, to client 302. At this point, client 302 can use the RSSI associated with best signal path 304 to determine its wireless connection distance 303, i.e. relative position r4, to access point 301. Access point 301 can transmit an angle e (theta)(taken from an x-axis to the best signal path 304) and an angle T (phi)(taken from the best signal path 304 to a path, which is measured by wireless connection distance 303, connecting client 302 and access point 301) to client 302. At this point, the coordinate position (x4, y4, z4) of client 302 can be accurately computed with the following formulae:

$$x4=x5+(r4*\cos(\Phi)*\cos(\theta))$$

$$y4=y5+(r4*\cos(\Phi)*\sin(\theta))$$

$$z4=z5+(r4*\sin(\Phi))$$

Positioning with Wireless Local Area Networks: Ad Hoc Mode

In accordance with another aspect of the invention, WLAN positioning can be used in an ad hoc communication mode. In the ad hoc mode, clients communicate directly with each other without using an access point or communication hub. Advantageously, a client can share certain information with at least one other client to compute a common "new" position. This information can include the clients' "old" (e.g. its most recent) positions and associated update times for those old positions. Note that the old positions as well as the update times could be provided by access points (from which the clients recently disassociated) or by downloaded and decoded GPS data (described below in further detail).

Figure 3B:
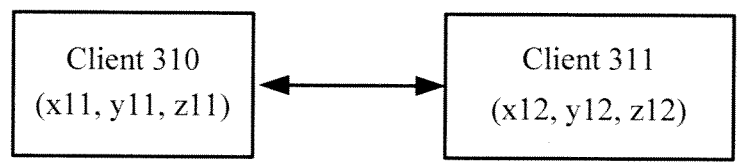
FIG. 3B illustrates two clients that can determine a common position in an ad hoc communication mode.

For example, referring to FIG. 3B, assume that client 310 had an old position (x11, y11, z11), which was updated ti seconds ago, and client 311 had an old position (x12, y12, z12), which was updated t2 seconds ago. In this case, their best estimate of their best estimate, common position will be:

$$x=w1*x11+w2*x12$$

$$y=w1*y11+w2*y12$$

$$z=w1*z11+w2*z12$$

where the weighting factors w are defined as:

$$w1=(1/t1)/(1/t1+1/t2)$$

$$w2=(1/t2)/(1/t1+1/t2).$$

It should be noted that the above is just one example formula intended to weight the solution more toward the "newer" position. It will be less reliable as the parties' positions age. Thus, if time t1 is significantly smaller than time t2 (i.e. the position of client 310 was updated much more recently), then the weighting factor w1 will be close to 1 whereas the weighting factor w2 will be close to 0. In this case, client 311 would effectively get its position from client 310.

In an area densely populated by access points, the amount of time spent by clients between access points, thereby requiring the use of an ad hoc network for communication, is minimized. Thus, the time updates of the old positions (e.g. t1 and t2) are small, which increases the probability that the old positions are substantially accurate. Of importance, the above formulae can be scaled to any number of clients associating in the ad hoc mode.

Positioning with WLAN Aided GPS

In accordance with another aspect of the invention, a WLAN can advantageously provide some limited, but critical, position information before initiating GPS, thereby dramatically reducing the time needed to determine the position of the wireless device using GPS. As previously indicated, a conventional GPS receiver can take up to 12.5 minutes to decode all GPS data. WLAN assisted GPS can advantageously reduce this time to between 3-6 seconds or less.

GPS: General Overview

In a conventional cold start, a GPS receiver does not know the time, its approximate location, or the GPS almanac. Because the GPS receiver does not know which satellite of the 24 satellites to search for first, the GPS receiver initiates a search for an arbitrarily chosen satellite. The GPS receiver continues the search for one or more satellites until one satellite is found and the GPS data can be decoded.

Of importance, all GPS satellites are broadcasting at the same frequency. However, each GPS satellite is broadcasting a coarse acquisition (C/A) code that can uniquely identify it. Specifically, the C/A code is a pseudo random noise (PRN) code, i.e. the code exhibits characteristics of random noise. Currently, there are 37 PRN code sequences used in the C/A code. Each GPS satellite broadcasts a different code sequence. Thus, each GPS satellite can be identified by its PRN number.

The C/A code includes a sequence of binary values (i.e. zeros and ones) that is 1023 "chips" long (wherein a chip refers to a binary value associated with identification rather than data). The GPS satellite broadcasts the C/A code at 1.023 Mchips/sec. Thus, the C/A code can be (and actually is) repeated every millisecond.

A GPS receiver includes correlators to determine which PRN codes are being received and to determine their exact timing. To identify a GPS satellite, a correlator checks a received signal against all possible PRN codes. Note that a GPS receiver typically stores a complete set of pre-computed C/A code chips in memory, thereby facilitating this checking procedure.

Of importance, even if the GPS receiver uses the right PRN code, it will "match" the received signal only if the PRN code lines up exactly with the received signal. In one embodiment, to facilitate a quick matching functionality, the GPS receiver includes a C/A code generator implemented by a shift register. In this embodiment, the chips are shifted in time by slewing the clock controlling the shift register. Thus, for each C/A code, correlation of the PRN code and the received signal could take from 1 millisecond (best case) up to 1023 milliseconds (worst case). Usually, a late version of the code is compared with an early version of the code to ensure that the correlation peak is tracked.

Even after matching the received signal from the GPS satellite, the GPS receiver still needs to completely decode the GPS data before the position can be computed. The GPS data structure is provided in five sub-frames: sub-frame #1 that includes satellite clock correction data, sub-frame #2 that includes satellite ephemeris data (part I), sub-frame #3 that includes satellite ephemeris data (part II), sub-frame #4 that includes other data, and sub-frame #5 that includes the almanac data for all satellites. Currently, GPS receivers take up to 12.5 minutes to decode all five sub-frames.

WLAN Provides a Head Start to GPS

In accordance with one feature of the invention, the decoded GPS data can be either downloaded from a dedicated server in the WLAN network (note that each access point, e.g. the access points shown in FIGS. 1 and 2, are connected to a wired network) or could be stored by the access point. In either case, assuming that the downloaded/stored decoded GPS data is still accurate and the GPS receiver (i.e. the client) remains substantially in the last updated position, determining the position could be reduced by 12.5 minutes. In one embodiment, the decoded GPS data could be transferred to the GPS receiver periodically. For example, in one embodiment, the decoded GPS data could be transferred every 5-10 minutes. Because the decoded GPS data is small given a typical WLAN bandwidth, this periodic transfer should have negligible impact to WLAN throughput.

In accordance with another feature of the invention, the GPS receiver can quickly compute the best satellite to search for, i.e. the satellite with the highest elevation angle (explained in detail below). Specifically, the GPS receiver can compute the satellite with the highest elevation angle using the GPS almanac data (provided by the decoded GPS data), the approximate current time (provided by the access point), and the latest position (also provided by the access point).

Figure 4A:
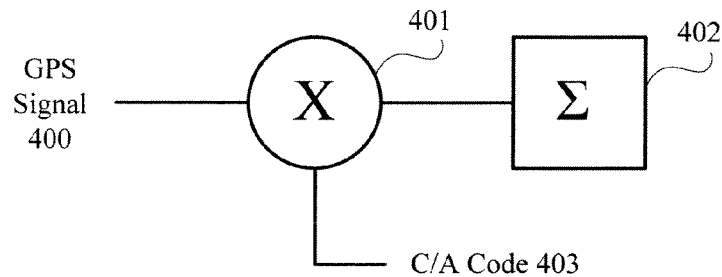
FIG. 4A illustrates a simplified diagram in which one correlator is used to provide locking of the GPS satellite.

In accordance with another feature of the invention, the number of correlators can be varied to provide quick and accurate locking of that GPS satellite. FIG. 4A illustrates a simplified diagram in which only one correlator is used. Specifically, a mixer 401 (which performs an exclusive OR logic operation, i.e. a binary multiplication) receives a GPS signal 400 from a satellite as well as a C/A code 403 from a C/A generator. An accumulator 402 accumulates mixer output for the complete C/A code period, e.g. 1 millisecond. At this point, accumulator 402 is reset and repeats the process. A single correlator typically takes on the order of 60 seconds to lock onto the first satellite. (Note that components of the analog portion of the GPS architecture, such as amplifiers, filters, etc., are not shown for simplicity.) To maintain a lock on the satellite, a delay lock loop (DLL) can be used, thereby ensuring that the complete GPS data can be downloaded without interruption.

Figure 4B:
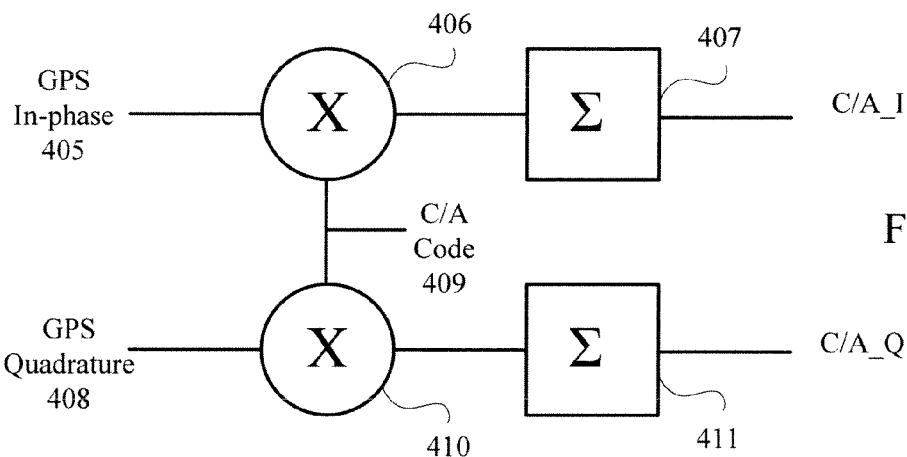
FIG. 4B illustrates a correlator search pair that can be used in cases where the carriers are separated.

GPS signal 400 is the received GPS signal down-converted to baseband with an in-phase signal and a quadrature phase signal mixed. Specifically, the GPS signal is a binary phase shift keying (BPSK) modulated signal having two carriers, wherein the carriers have the same frequency, but differ in phase by 90 degrees (i.e. one quarter of a cycle). One signal, called the in-phase (I) signal, is represented by a cosine wave, whereas the other signal, called the quadrature (Q) signal, is represented by a sine wave. FIG. 4B illustrates a correlator search pair that can be used in cases where the carriers are separated. In this case, a GPS in-phase signal 405 can be provided to a mixer 406 and a GPS quadrature signal 408 can be provided to a mixer 410. Both mixers 406 and 410 receive the locally generated C/A code 409. In this embodiment, the I value is accumulated as is the Q value by accumulators 407 and 411, respectively.

By forming a root-sum-square (RSS) of the output C/A_I and C/A_Q values, the GPS receiver can determine whether it has successfully acquired the GPS satellite. Specifically, the GPS receiver is looking for the highest $I^2+Q^2$ value over all the 1023 different C/A code offset positions. After the highest value (above a programmable threshold), is found, the GPS satellite is "acquired". Thus, the carrier tracking loop can be closed based on the C/A_I and C/A_Q values.

Figure 4C:
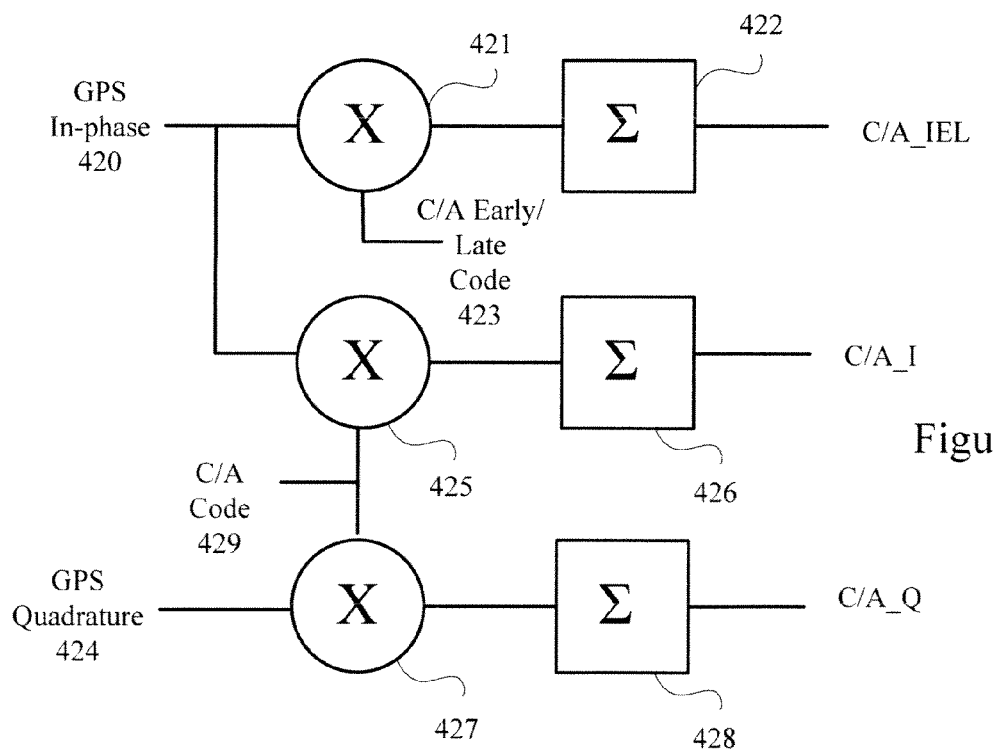
FIG. 4C illustrates a correlator tracking set that can be used in cases where the early/late versions of the C/A code are tracked.

FIG. 4C illustrates a correlator tracking mode that can be used in cases where the early/late versions of the code are tracked. In this case, the GPS in-phase signal 420 can be provided to mixers 421 and 425 and the GPS quadrature signal 424 can be provided to a mixer 427. Both mixers 425 and 427 receive the locally generated C/A code 429. However, mixer 421 receives a early/late version of C/A code 423 (i.e. an in-phase early signal minus an in-phase late signal). In this embodiment, the I value, the Q value, and the I early/late (IEL) value are accumulated by accumulators 426, 428, and 422, respectively. Once again, by forming a root-sum-square (RSS) of the C/A_I and C/A_Q values, the GPS receiver can determine whether it has successfully acquired the GPS satellite. To "lock" the satellite, known delay lock loop techniques can be used with the C/A_I and C/A_EL values to close the C/A code tracking loop.

In one embodiment, to shorten the time to acquire (i.e. lock onto) the first satellite, multiple correlators in the GPS receiver can be used to search on the same satellite in parallel with different time and/or frequency offsets. Note that both the GPS satellite and the GPS receiver use oscillators to generate their signals. Typically, the GPS receiver uses a crystal oscillator with a frequency variation of +/−20 ppm (parts per million). Because the GPS satellite signal is located at 1.575 GHz, the frequency offset between the two oscillators could be from −30 kHz to +30 kHz (1.575e9×20e-6=30e3). Thus, locking of the GPS signal can include adjusting the GPS receiver oscillator to provide exactly the same frequency as the GPS signal.

Assuming 24 correlators are implemented in a GPS receiver, these correlators can be partitioned into 12 search pairs (see FIG. 4B) with each search pair containing an in-phase correlator and a quadrature-phase correlator. In this embodiment, the worst search time would be 5 seconds (i.e. (60 frequency offset×1 second)/12) and the average search time would be 2.5 seconds (i.e. (30 frequency offset×1 second)/12). Logically, if more correlators are implemented in the GPS receiver, the search time could be decreased proportionally. For example, if 48 correlators are implemented, then the worse search time using search pairs would be 2.5 seconds and the average search time would 1.25 seconds.

After the first satellite is acquired, the 24 correlators can be partitioned into 8 correlator tracking sets (see FIG. 4C) with each tracking set containing an in-phase correlator, a quadrature-phase correlator, and an I early/late (IEL) correlator (or a Q early/late (QEL) correlator). In this case, the 24 correlators can lock 8 satellites in parallel.

Of importance, in addition to the GPS data (which is provided by the WLAN), 4 pseudo-range measurements from 4 GPS satellites are needed to compute a coordinate position. Specifically, because the GPS receiver must solve an equation including four variables x, y, z, and Δt, the pseudo-range measurements from four GPS satellites is needed. Advantageously, after the time and frequency offsets based on the first satellite are acquired, the time and the frequency offsets of the other three satellites can be derived from the first satellite.

Specifically, the time offset can be quickly computed for the other satellites because the GPS receiver already has decoded GPS data and an approximate location from the WLAN. For example, with one C/A code chip equal to 300 meters (1 millisecond/1023 chips), a search over 10 kilometers will take approximately 30 milliseconds with one correlator.

The frequency offset includes two parts: the frequency offset of the GPS receiver oscillator and the Doppler effect of satellite movement. Because the first satellite was selected to be the satellite having the highest elevation (i.e. the satellite is substantially overhead), the Doppler effect is approximately zero (explained below). Thus, the frequency offset is the difference between the GPS satellite oscillator frequency, which is very stable at 1.575 GHz, and the GPS receiver frequency. Using the time and frequency offsets as well as the decoded GPS data, the GPS receiver can efficiently compute its relative position with respect to the GPS satellite (i.e. the speed of light×Δt=relative position R).

Because the frequency offset of the GPS receiver is now known, only the Doppler effect for each of the other three GPS satellites needs to be computed. These Doppler effects can be quickly computed based on the decoded GPS data.

With respect to the GPS satellite Doppler effect, note that the radius of the Earth is about 6,378 kilometers and the GPS orbit is 20,200 kilometers above the ground. Thus, with a period of 12 hours, the speed v of each GPS satellite is:

(6378+20200)*10e3*2π/(12*60*60)=3865 meters/second.

The Doppler effect f_d can be computed using the following equation: f_d=f_c*v*cos θ/c
where f_c is the carrier (GPS satellite oscillator) frequency and c is speed of light.

Figure 5:
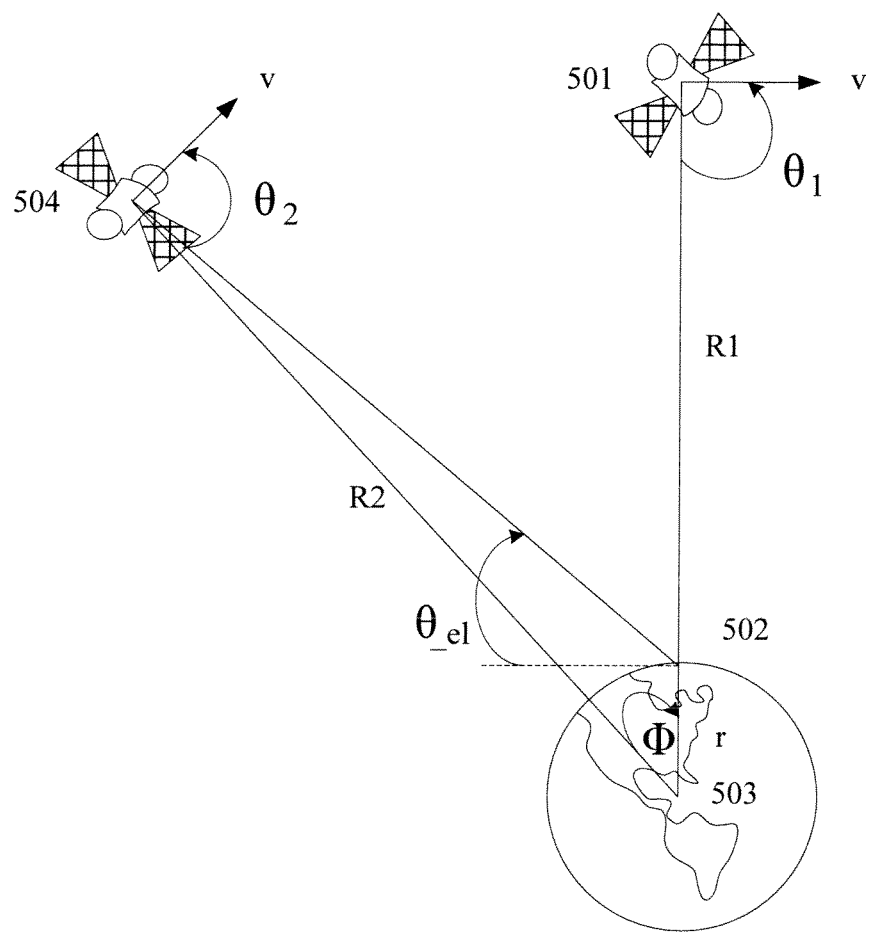
FIG. 5 illustrates exemplary angles, wireless connection distances, and resulting Dopper effects for two satellites.

Thus, referring to FIG. 5, the satellite having the highest elevation, i.e. satellite 501, has an angle $\theta_1$ of 90 degrees (wherein the cos $\theta_1$ is zero). Therefore, the Doppler effect would also be zero. However, the Doppler effect for satellite 504 is:

$$f\_d=f\_c*v*\cos\theta_2/c=$$

where $\theta_2$ is equal to (θ_e1+φ) and θ_e1 is the elevation angle. Thus, the worst case Doppler effect for satellite 504 would be the case where θ is 180 degrees (wherein the cos $\theta_2$ is one). In this case, f_d=1.575e9 *3865/3e8=20 kHz.

System Overview Including WLAN and WLAN Aided GPS

Advantageously, the position techniques using WLAN and the WLAN aided GPS are complementary. Specifically, if the client is operating within a WLAN, then a client can quickly compute its relative and/or a coordinate position using information from an access point. At this point, no GPS tracking is necessary because an acceptably accurate location of the client can be provided solely via the WLAN.

When the client disassociates with the WLAN, the WLAN can provide the client with decoded GPS data, thereby ensuring quick and reliable positioning capability. Specifically, the information provided by the WLAN can be used to determine which satellite has the highest elevation angle, i.e. the satellite that is directly overhead. Therefore, the GPS receiver in the client has the greatest probability of not being blocked when searching for this satellite. Additionally, once the client is locked to this satellite, the time and frequency offsets of other satellites can be quickly computed.

Figure 6:
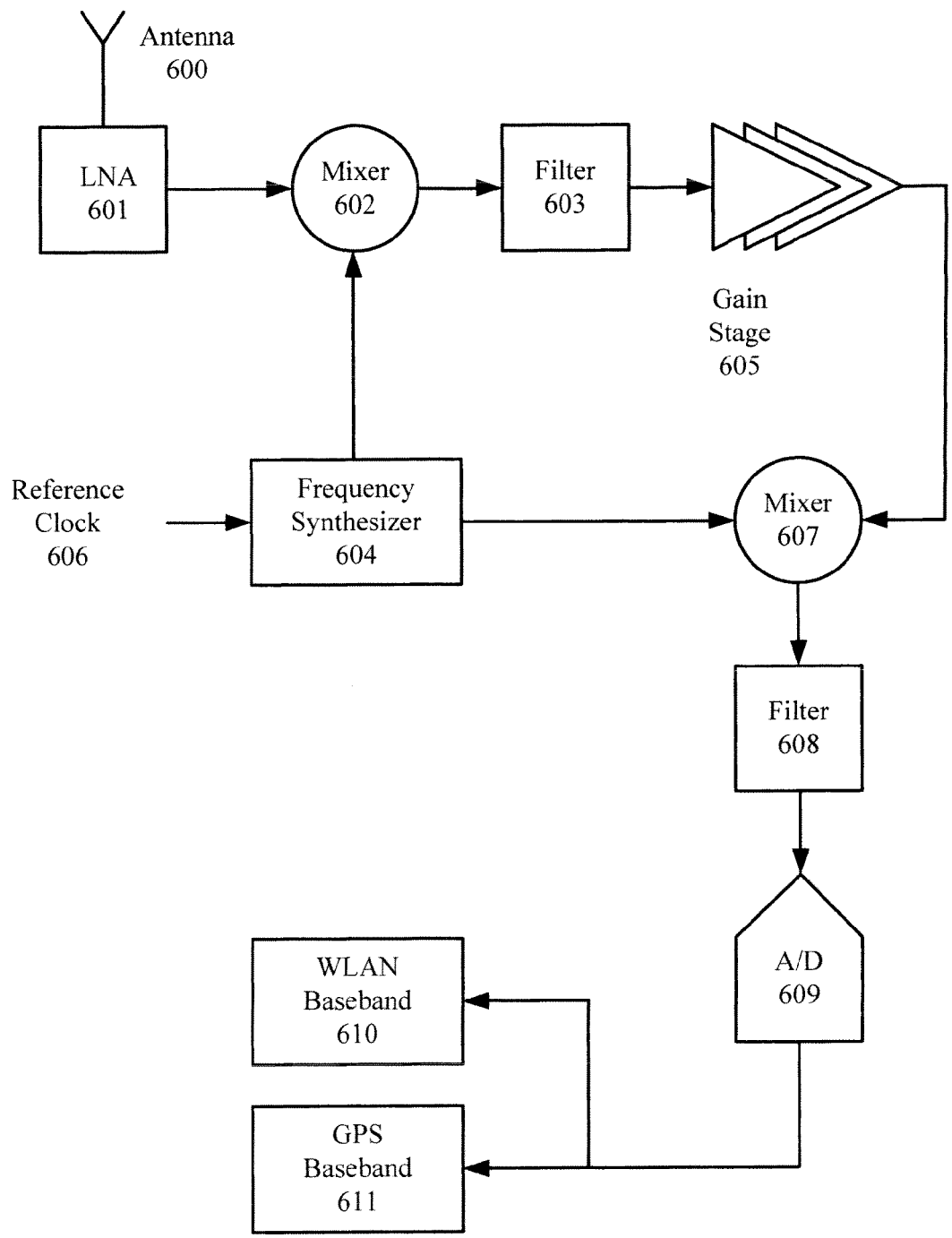
FIG. 6 illustrates exemplary components in a WLAN system that can advantageously be shared between WLAN broadband and GPS broadband.

As shown in FIG. 6, the components associated with a radio frequency (RF) front end can be advantageously shared between WLAN and GPS because they are not running at the same time. Specifically, WLAN baseband 610 and GPS baseband 611 can share an antenna 600, a low noise amplifier (LNA) 601, mixers 602/607, a filter 603, a frequency synthesizer 604, a gain stage 605, and an analog to digital (A/D) converter 609. Note that FIG. 6 illustrates only some of the components of a WLAN system. Other components needed or desired for operation of WLAN baseband 610 could also be included in this system without affecting GPS baseband 611.

Of importance, WLAN baseband 610 and GPS baseband 611 operate at different carrier frequencies. For example, WLAN baseband 610 can operate at 5 GHz (IEEE 802.11a standard) or at 2.4 GHz (IEEE 802.11b) whereas GPS baseband 611 can operate at 1.575 GHz. In accordance with one feature of the invention, frequency synthesizer 604 can be programmed using a reference clock 606 to provide the appropriate frequency to mixer 607, i.e. to effectively switch between WLAN baseband 610 and GPS baseband 611.

Note that the additional circuitry needed for GPS baseband operation in a WLAN system is incremental. Specifically, the number of digital circuits for baseband GPS processing is estimated to be less than 50K gates for 24 correlators. Thus, the cost for a 0.13 micron CMOS chip is commercially negligible.

Exemplary Applications

The WLAN position technique can be used to provide E911 service for cell phones. As noted previously, conventional GPS receivers cannot work indoors or under other circumstances where a GPS signal cannot be received. However, a WLAN can advantageously provide accurate position information to its clients using an access point, which already knows its GPS location. Even when a client disassociates with the access point, the WLAN can provide time, location, and decoded GPS data to the client before disassociation. In this manner, the client can significantly reduce the time to acquire the necessary GPS satellite data (i.e. on the order of seconds instead of minutes).

The WLAN position technique can advantageously augment the navigation tools of any type of wireless device, e.g. PDAs, cell phones, and notebooks. For example, the wireless device can provide local maps and points of interest for later GPS navigation with WLAN aided information. These navigation tools could be used from any location, e.g. home, work, airports, restaurants, hotels, etc.

The WLAN position technique can advantageously be used in conjunction with location based applications. Specifically, a client can download a location based application and its related database from the WLAN and then move to a new location with or without WLAN connections. For example, a client could connect to an access point in a coffee shop in Tokyo. At this point, an application server could quickly determine the client's location through the access point and then feed local maps along with other local point of interests (POI) to the client through the access point. Using this information, the client could then use the WLAN position technique or the WLAN aided GPS technique to navigate to a new location.

Note that generally the positional accuracy provided by the WLAN device is proportional to the typical range of the radio propagation. For example, if a current standard has a radio propagation range of N meters, then the accuracy of positioning with the WLAN device using that standard is within N meters.

It will be understood that the disclosed embodiments regarding WLAN and WLAN aided GPS positioning techniques are exemplary and not limiting. Accordingly, is intended that the scope of the invention be defined by the following Claims and their equivalents.

The invention claimed is:

1. A method comprising:
   determining a plurality of access points in a communications system;
   determining a location of a wireless device in the communications system based at least in part on information from the plurality of access points, the information including received signal strength indicators; and
   acquiring a satellite positioning system signal at the wireless device based at least in part on the location.

2. The method of claim 1, wherein said determining the location includes using a server of the communications system to assist in at least part of said determining the location.

3. The method of claim 1, wherein said determining the location is performed solely by the wireless device.

4. The method of claim 1, further including using the satellite positioning system signal to generate a modified location of the wireless device.

5. The method of claim 1, further including storing the satellite positioning system signal for use by the wireless device.

6. The method of claim 1, further including periodically acquiring the satellite positioning system signal for use by the wireless device.

7. A wireless device for operating with a communications system, the wireless device to perform a location technique comprising:
   determining a plurality of access points in the communications system;
   determining a location of the wireless device based at least in part on information from the plurality of access points, the information including received signal strength indicators; and
   acquiring a satellite positioning system signal at the wireless device based at least in part on the location.

8. The wireless device of claim 7, wherein said determining the location includes using a server of the communications system to assist in at least part of said determining the location.

9. The wireless device of claim 7, wherein said determining the location is performed solely by the wireless device.

10. The wireless device of claim 7, further including using the satellite positioning system signal to generate a modified location of the wireless device.

11. The wireless device of claim 7, further including storing the satellite positioning system signal for use by the wireless device.

12. The wireless device of claim 7, further including periodically acquiring the satellite positioning system signal for use by the wireless device.

13. A wireless device comprising:
   means for determining a plurality of access points in a communications system;
   means for determining a location of the wireless device based at least in part on information from the plurality of access points, the information including received signal strength indicators; and
   means for acquiring a satellite positioning system signal at the wireless device based at least in part on the location.

14. The wireless device of claim 13, wherein said means for determining the location includes a server of the communications system to assist in at least part of determining the location.

15. The wireless device of claim 13, wherein said means for determining the location is included in the wireless device.

16. The wireless device of claim 13, further including means for using the satellite positioning system signal to generate a modified location of the wireless device.

17. The wireless device of claim 13, further including means for storing the satellite positioning system signal for use by the wireless device.

18. The wireless device of claim 13, further including means for periodically acquiring the satellite positioning system signal for use by the wireless device.

19. A communications system including a plurality of access points, a wireless device, and a server, the wireless device and the server to perform a technique comprising:
   determining a plurality of access points using the wireless device;
   determining a location of the wireless device using the server based on information from the plurality of access points, the information including received signal strength indicators of at least some of the plurality of access points; and
   acquiring a satellite positioning system signal at the wireless device based at least in part on the location.

20. The communications system of claim 19, further including using the satellite positioning system signal to generate a modified location of the wireless device.

21. The communications system of claim 19, further including storing the satellite positioning system signal for use by the wireless device.

22. The communications system of claim 19, further including periodically acquiring the satellite positioning system signal for use by the wireless device.

* * * * *